2,952,515
METHOD OF PRODUCING VANTHOFFITE

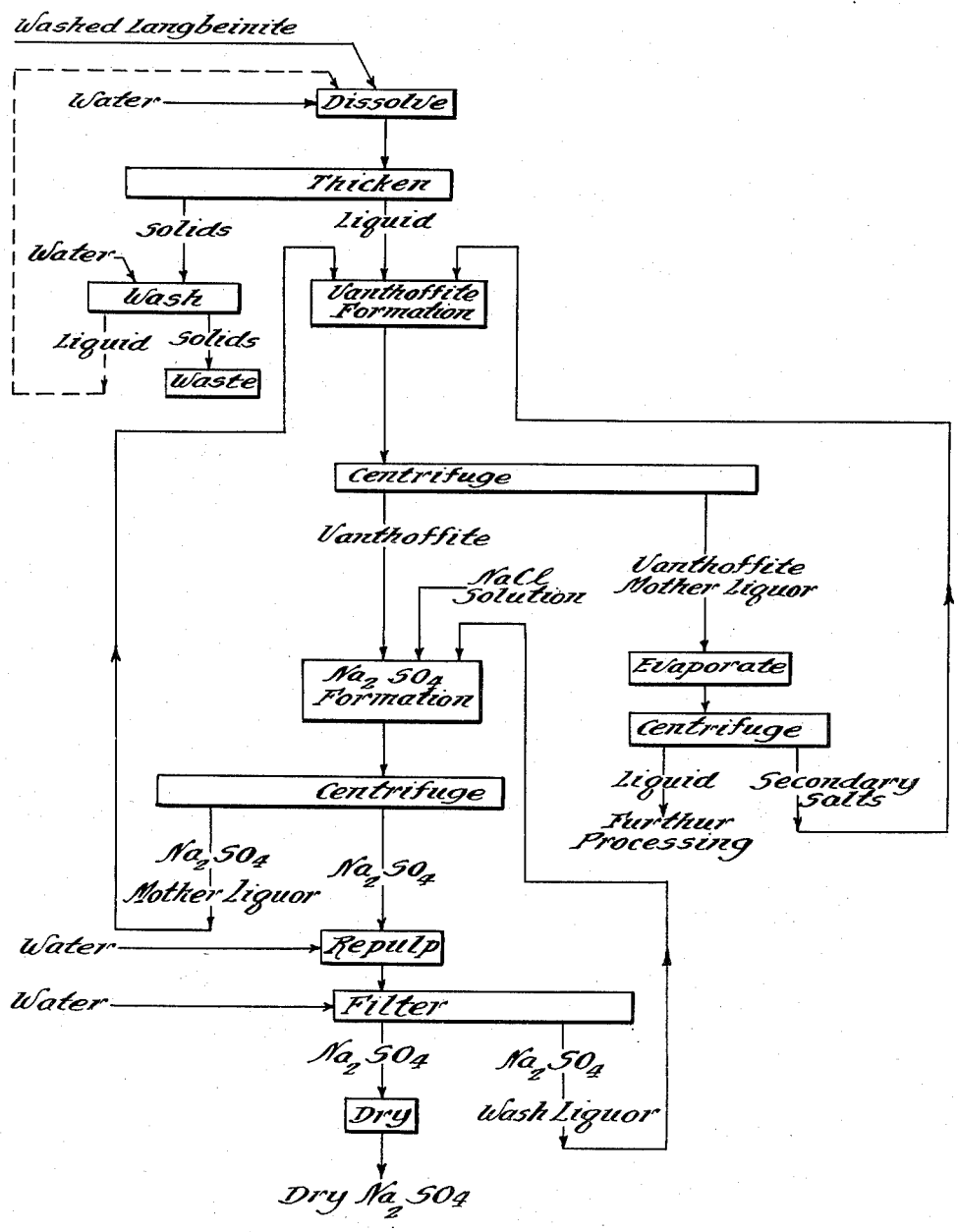

William B. Dancy, Carlsbad, N. Mex., assignor to International Minerals & Chemical Corporation, a corporation of New York Filed Oct. 8, 1958, Ser. No. 766,075

8 Claims. (Cl. 23—121)

This invention relates to the production of sodium sulfate. More particularly, it relates to the production of sodium sulfate via vanthoffite from magnesium sulfate.

The art shows various methods for producing sodium sulfate, many of which require costly materials and/or elaborate processes. One such method involves the production of sodium sulfate by treating sodium chloride with sulfur dioxide, air, and steam at a temperature between about 400 and about 450° C. with the aid of a catalyst such as ferric or cupric oxide (British Patent Nos. 3045 and 3047 (1870)). In this procedure the presence of a reactive gas is required as well as a high temperature, necessitating large scale production of heat.

Another method comprises the heating of astrakanite ($Na_2SO_4 \cdot MgSO_4 \cdot 4H_2O$) with carbon to a red glow, producing a mixture of sodium sulfate, magnesium oxide, sulfur dioxide and carbon monoxide (German Patent No. 368,935 (1921)). The end products, sulfur dioxide and carbon monoxide, produce hazardous operating conditions. Additional steps are required to remove the sodium sulfate from the reaction mixture.

A three-step method for the production of sodium sulfate is disclosed in United States Bureau of Mines Report of Investigations No. 3299, March 1936, wherein a solution of magnesium sulfate is commingled with sodium chloride and reacted at elevated temperatures around 75° C. to yield astrakanite

The astrakanite is admixed with a solution containing sodium chloride and sodium sulfate, and allowed to react at about 107° C. to produce vanthoffite

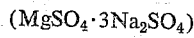

The vanthoffite is reacted with sodium chloride at a temperature around 55° C. to yield sodium sulfate.

An object of the present invention is to provide an improved process for the production of vanthoffite.

Another object is to provide a one-step process for the production of vanthoffite from magnesium sulfate.

Another object is to provide a one-step process for the production of vanthoffite from potassium-magnesium double sulfates.

Another object is to provide a process for the production of potassium-free vanthoffite.

Another object is to provide an improved, yet simple, process for the production of sodium sulfate by the efficient utilization of langbeinite, schoenite, leonite or other potassium-magnesium double sulfates.

Another object is to produce sodium sulfate from magnesium sulfate in a maximum of two conversion steps.

Another object is to provide an improved process for the production of sodium sulfate which produces commercially attractive yields and a product of high purity.

Still further objects and advantages of the present invention will be apparent from the following detailed description.

Vanthoffite is prepared in the present invention from magnesium sulfate, mixtures of potassium and magnesium sulfates, and potassium and magnesium double sulfates, such as langbeinite ($2MgSO_4 \cdot K_2SO_4$), schoenite ($MgSO_4 \cdot K_2SO_4 \cdot 6H_2O$), and leonite $$(MgSO_4 \cdot K_2SO_4 \cdot 4H_2O)$$

In accordance with the present invention, solid-phase vanthoffite, substantially potassium-free, is produced in a single step by reacting sodium chloride with magnesium sulfate or with a mixture of potassium and magnesium sulfates in aqueous solution at a temperature above about 80° C. and under other operating conditions more fully described below. The solid vanthoffite is separated from the product slurry, during which separation any potassium salts that may be present remain in solution and are separated thereby from the vanthoffite.

The vanthoffite may then be readily converted into sodium sulfate in an advantageous manner by reaction with sodium chloride in aqueous solution at temperatures above about 35° C. The sodium sulfate product is obtained in high purity and in a yield approximating 100% of the sodium sulfate present in the vanthoffite.

In a specific embodiment of the present invention langbeinite is dissolved in water at about 80° C., the amount of water being sufficient to dissolve substantially all of the sulfates. Slimes are removed from the solution in a thickener. The solution is then admixed with recycled sodium sulfate mother liquor and recycled "secondary salts," comprised of sodium chloride with small proportions of potassium and magnesium chlorides and sulfates, in amounts to produce a solution containing about 5 parts of magnesium and about 30 parts of chloride per 100 parts of water. The mixture is stirred and allowed to react at a temperature of about 95° C. for about 1 to 3 hours to produce solid vanthoffite. The vanthoffite is separated from the reaction mixture by centrifugal means, filtration, or the like, during which separation substantially all potassium values are removed in the liquid phase.

The vanthoffite is commingled and reacted with sodium chloride brine from the langbeinite ore washing process and sodium sulfate mother liquor, the total reaction mixture containing about 3 parts of magnesium and about 20 parts of chloride per 100 parts of water. The mixture is allowed to react at a temperature of about 45° C. for about 3 to 4 hours to produce sodium sulfate as a solid phase. The sodium sulfate is separated from the reaction mixture by filtration, by centrifugal means, or the like, and washed with water, filtered, and dried to yield a high purity product.

In the preparation of vanthoffite according to the present invention, magnesium sulfate or a potassium-magnesium double salt comprised thereof is dissolved in water, suitably at a temperature between about 30° C. and the boiling temperature of the resulting solution, preferably around 80° C. The magnesium content of the solution should be between about 35 and about 50 moles of magnesium per 1000 moles of water, preferably about 43 moles. The resulting solution is thickened if necessary to remove any slimes therefrom as an underflow. The deslimed solution is admixed with sodium chloride and water in a proportion sufficient to produce a mixture containing up to but not exceeding about 5 parts of magnesium per 100 parts of water (equivalent to about 37 moles per 1000 moles of water) and up to but not exceeding about 30 parts of chloride per 100 parts of water (equivalent to about 150 moles per 1000 moles of water). The potassium content of the mixture should also be limited, the maximum tolerable proportion being about 8 parts of potassium per 100 parts of water (equivalent to about 37 moles per 1000 moles of water).

The mixture is allowed to react with stirring at a temperature above about 80° C., preferably about 95° C., to form vanthoffite as a solid phase. About 2 to about 4 hours are generally sufficient for the vanthoffite reaction to reach substantial completion. The solid vanthoffite is separated from the reaction product mixture by centrifugal means, during which separation any contaminating potassium is substantially completely removed in the liquid phase.

The vanthoffite is converted into sodium sulfate according to the following procedure. A sodium chloride brine, suitably obtained by washing langbeinite ore, is commingled with vanthoffite and optionally with a sodium sulfate mother liquor from a later stage of the process, the proportions being adjusted to produce a mixture containing magnesium in a ratio not greater than about 3 parts per 100 parts of water and chloride in a ratio not greater than about 20 parts per 100 parts of water. The mixture is stirred and allowed to react at a temperature between about 35 and about 55° C., preferably about 48° C. to form crystalline sodium sulfate. About 2 to about 4 hours are generally sufficient for the reaction to reach substantial completion.

The sodium sulfate is separated from the reaction mixture by centrifugal means. It is repulped with water, filtered and dried to yield sodium sulfate of high purity.

The present invention may be more fully understood from the following specific example, to be read in conjunction with the attached flowsheet, illustrating a continuous process designed to produce 363 tons of sodium sulfate per day.

*Example*

Prewashed langbeinite (375 tons) containing 3.0% sodium chloride is ground to minus 200 mesh and slurried at 80° C. in water (736 tons), wherein most of the sulfates dissolve.

The slurry is thickened at between 75 and 80° C. to separate the slimes therefrom. The slimes are withdrawn as an underflow, washed in a tray-type washer, and sent to waste. The liquor from the tray washer is optionally recycled to the dissolving step to reduce the quantity of fresh water required and to make use of the materials dissolved therein.

The overflow solution from the thickener is admixed with sodium sulfate mother liquor (1833 tons), having the following composition,

| K | Mg | Na | Cl | SO$_4$ | H$_2$O |
|---|---|---|---|---|---|
| 9.8 | 26.5 | 152.2 | 244.3 | 103.7 | 1,296.6 | and "secondary salts" (644 tons) from a subsequent step of the process, to be more fully described hereinafter. The resulting mixture is stirred and allowed to react at a temperature of 95° C., forming vanthoffite as a crystalline solid phase. Two hours are generally sufficient for the formation of the solid vanthoffite.

Vanthoffite (528 tons) is separated from the reaction mixture by centrifugal means while still at an elevated temperature of 95° C., leaving vanthoffite mother liquor (3024 tons) having the following composition, in tons:

| K | Mg | Na | Cl | SO$_4$ | H$_2$O |
|---|---|---|---|---|---|
| 109.6 | 68.2 | 200.0 | 500.1 | 144.2 | 2,001.9 |

This mother liquor is treated as hereinafter described to yield secondary salts which are recycled to the vanthoffite reaction, described above.

The vanthoffite is commingled with clarified saturated sodium chloride brine (1431 tons) from the langbeinite ore washing step, and with sodium sulfate wash liquor (400 tons), having the following compositions respectively, in tons:

| | K | Mg | Na | Cl | SO$_4$ | H$_2$O |
|---|---|---|---|---|---|---|
| Langbeinite Wash Brine | 6.7 | 4.2 | 144.4 | 222.8 | 24.9 | 1,028.8 |
| Sodium Sulfate Wash Liquor | 0.3 | 0.7 | 41.6 | 6.4 | 81.4 | 269.9 |

The resulting mixture is agitated for 2 hours at 45–48° C., during which time sodium sulfate (527 tons) crystallizes in the form of the anhydrous salt.

The reaction mixture is centrifuged to separate the sodium sulfate from the mother liquor (1833 tons). The sodium sulfate is repulped in water, filtered, washed with water, and dried. The product is sodium sulfate (363 tons) of high purity.

The vanthoffite mother liquor (3024 tons) from the vanthoffite centrifuge is further processed as follows: The liquor is evaporated until the liquid phase approaches saturation with potassium chloride. "Secondary salts" are precipitated thereby in a total quantity of 664 tons, having the following analysis, in tons:

| K | Mg | Na | Cl | SO$_4$ | H$_2$O |
|---|---|---|---|---|---|
| 37.6 | 23.4 | 169.2 | 271.5 | 124.5 | 37.6 |

The secondary salts are separated by centrifugal means and recycled to the vanthoffite formation step. The secondary salts mother liquor, comprised largely of magnesium chloride and potassium chloride constitutes an excellent source of material for the production of magnesium oxide as taught in U.S. Patent 2,809,880 (Dancy-Gloss-Shaw, October 1957).

It is to be understood that the preceding description and example have been given for the purpose of illustration only and the scope of the invention is not limited thereto. Various adaptations and modifications of this invention will be apparent from the foregoing description.

In accordance with the foregoing description, what is desired to be secured by Letters Patent is:

1. A one-step process for the production of vanthoffite from magnesium sulfate which comprises commingling magnesium sulfate, sodium chloride, and water in amounts not exceeding about 5 parts of magnesium and not exceeding about 30 parts of chloride per 100 parts of water, the proportions thereof being greater than the concentrations thereof present in a saturated solution of vanthoffite at the reaction temperature subsequently employed, allowing the mixture to react at a temperature above about 80° C. until the conversion to vanthoffite is substantially complete, and recovering the solid vanthoffite from the resulting slurry.

2. A process for the production of vanthoffite which comprises commingling potassium and magnesium sulfates, sodium chloride, and water in amounts not exceeding about 5 parts of magnesium, not exceeding about 30 parts of chloride, and not exceeding about 8 parts of potassium per 100 parts of water, the proportions thereof being greater than the concentrations thereof present in a saturated solution of vanthoffite at the reaction temperature subsequently employed, allowing the mixture to react at a temperature above about 80° C. until the conversion to vanthoffite is substantially complete, and recovering the solid vanthoffite from the resulting slurry.

3. A process as in claim 2 wherein said potassium and magnesium sulfates are langbeinite.

4. A process as in claim 2 wherein said potassium and magnesium sulfates are schoenite.

5. A process as in claim 2 wherein said potassium and magnesium sulfates are leonite.

6. A process for the production of a substantially potassium-free vanthoffite from a mixture of potassium and magnesium sulfates which comprises commingling a mixture of magnesium and potassium sulfates, sodium chloride, and water in amounts not exceeding about 5 parts of magnesium, not exceeding about 30 parts of chloride and not exceeding about 8 parts of potassium per 100 parts of water, the proportions thereof being greater than the concentrations thereof present in a saturated solution of vanthoffite at the reaction temperature subsequently employed, allowing the mixture to react at a temperature between about 80° C. and the boiling point of the solution until the conversion to vanthoffite is substantially complete, and recovering the vanthoffite as a solid from the resulting slurry, whereby the potassium is removed therefrom in the liquid phase.

7. A process as in claim 6 wherein said mixture is allowed to react at a temperature around 95° C.

8. A process for the production of a substantially potassium-free vanthoffite from a mixture of potassium and magnesium sulfates which comprises commingling a mixture of potassium and magnesium sulfates, sodium chloride, and water in amounts of about 5 parts of magnesium, about 30 parts of chloride and less than about 8 parts of potassium per 100 parts of water, allowing the mixture to react at a temperature around 95° C. for around 2 hours, thereby forming solid vanthoffite, and recovering said vanthoffite substantially potassium-free from the resulting slurry, whereby the potassium values in the reaction mixture are removed in the liquid phase.

References Cited in the file of this patent

Conley et al.: "Anhydrous Sodium Sulphate from Saline Deposits or Brines by a Four-Stage Process," U.S. Bureau of Mines Report of Investigation No. 3299, 18 pages, March 1936.